Aug. 22, 1933. J. H. SHERTS ET AL Re. 18,918

PROCESS OF MAKING CURVED COMPOSITE GLASS PLATES

Original Filed April 24, 1930 2 Sheets-Sheet 1

INVENTORS
JAMES H. SHERTS AND
BY JOHN WILLITS.
Bradley & Bee
ATTORNEYS

Aug. 22, 1933. J. H. SHERTS ET AL Re. 18,918

PROCESS OF MAKING CURVED COMPOSITE GLASS PLATES

Original Filed April 24, 1930 2 Sheets-Sheet 2

INVENTORS
JAMES H. SHERTS AND
BY JOHN WILLITS.
Bradley & Bee
ATTORNEYS

Reissued Aug. 22, 1933 Re. 18,918

UNITED STATES PATENT OFFICE 18,918

PROCESS OF MAKING CURVED COMPOSITE GLASS PLATES

James H. Sherts, Brackenridge, and John Willits, Ford City, Pa., assignors to Duplate Corporation, a Corporation of Delaware Original No. 1,815,992, dated July 28, 1931, Serial No. 446,862, April 24, 1930. Application for reissue May 22, 1933. Serial No. 672,220

3 Claims. (Cl. 49—81)

Figure 1:
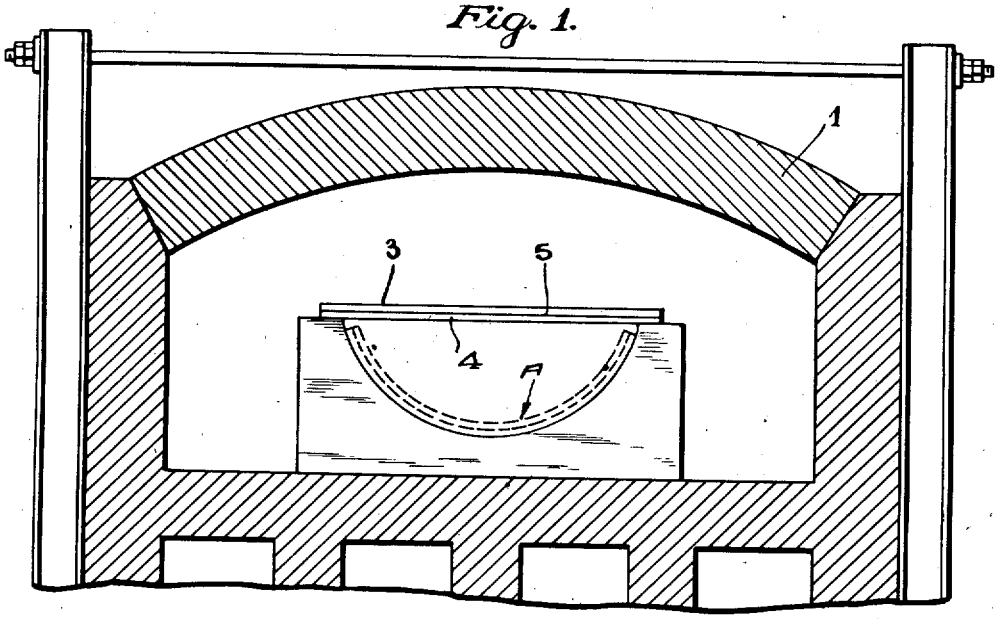
Figure 2:
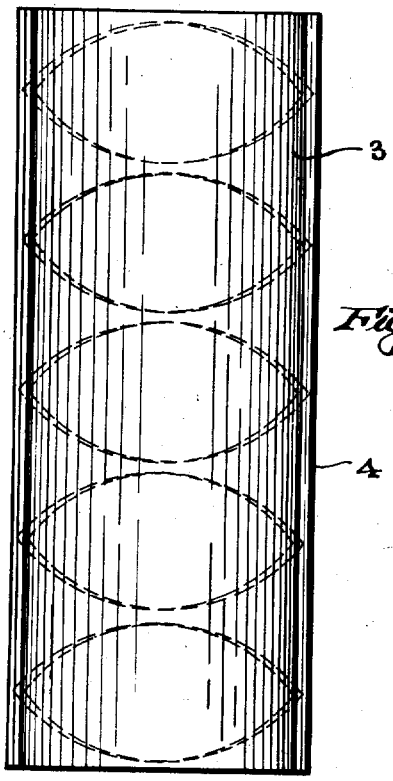
Figure 3:
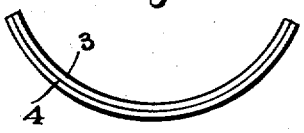
Figure 4:
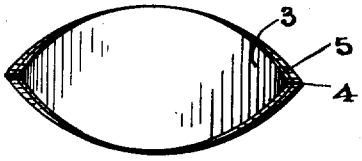
Figure 5:
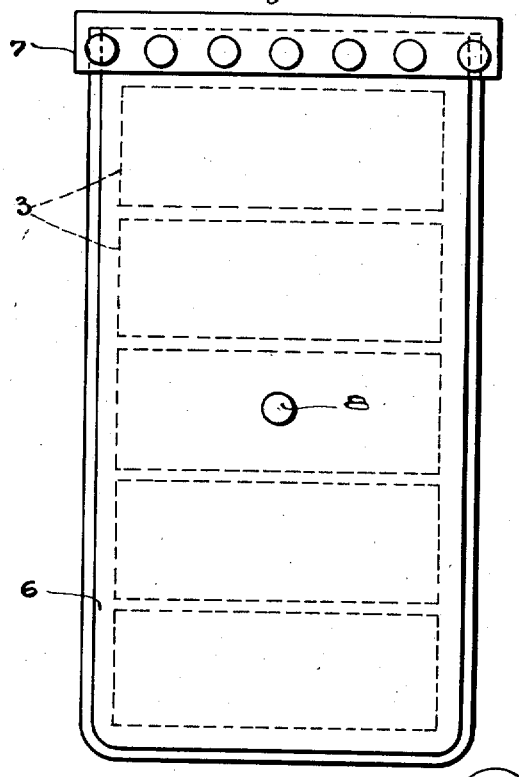
Figure 6:
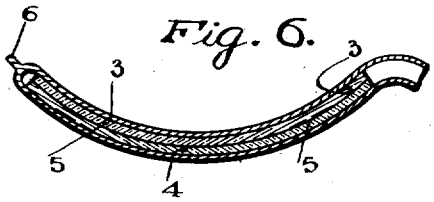
Figure 7:
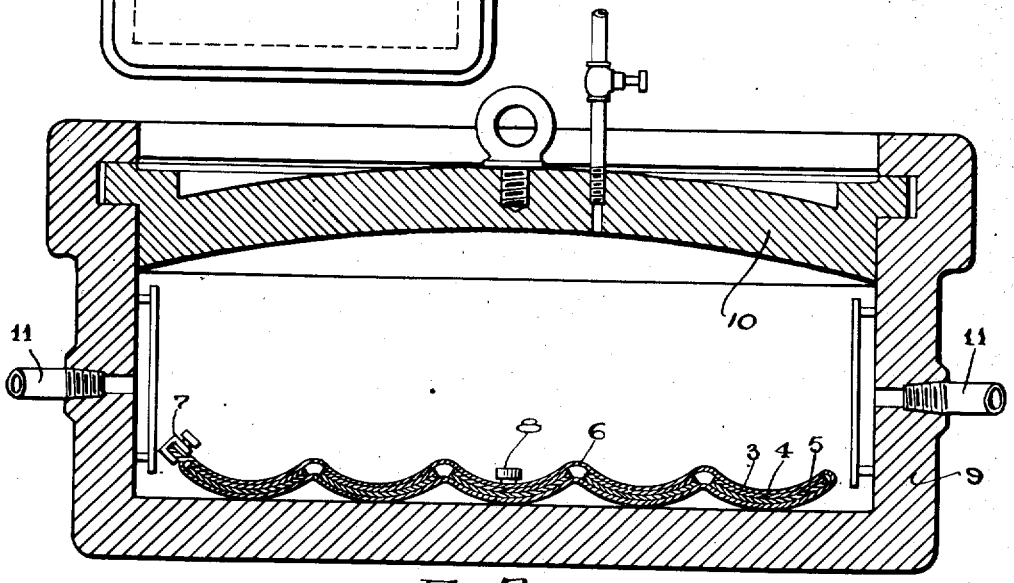

The invention relates to a process of making curved composite glass plates, ordinarily consisting of two glass sheets with an interposed sheet of pyroxylin plastic, although other reinforcing may be used if desired. One field of use for such plates is in the manufacture of goggle lenses and the process is illustrated as applied in such connection, but it will be understood that the bent laminated plates may be used in other relations. The invention has for its objects the provision of an improved process which insures that the two sheets shall have the same curvature upon their opposing surfaces, and reduces the breaking incident to compositing under heavy pressure to a minimum. The steps incident to the practice of the method and the apparatus preferably used are shown in the accompanying drawings, wherein:

Figure 1 is a vertical section through the kiln and mold in which the glass sheets are bent. Fig. 2 is a plan view of a pair of blanks which have been bent, the dotted lines indicating the lines of cutting in order to produce 5 pair of glass sheets from each pair of blanks. Fig. 3 is an end elevation of the pair of blanks shown in Fig. 2. Fig. 4 is a plan view of one of the complete goggle glasses. Fig. 5 is a plan view of one of the rubber bags in which the blanks are composited. Fig. 6 is a section through the bag and its contents on the line VI—VI of Fig. 5. And Fig. 7 is a vertical section through the pressure tank in which the rubber bags are placed in order to subject them to heat and pressure in the usual way.

Referring to Fig. 1, 1 is a furnace heated in any suitable manner; 2 is a mold in which the glass sheets to be composited are bent; and 3, 4 are a pair of glass sheets which are to be composited. These sheets are placed one upon the other as indicated in the drawings in full lines and upon the application of heat, they sink down into the mold 2 to the dotted line position indicated at A. The heat applied in order to secure this result is just sufficient to soften the glass so that the sheets will sink down to the position shown, but is not sufficient to cause the sheets to stick together. After the sheets 3 and 4 have thus been bent so that they fit each other, they are separated and a sheet of celluloid, which is to act as the reinforcing, is placed therebetween the celluloid sheet being shown at 5 in Fig. 6. In order to secure the adherence between the glass and celluloid, a suitable cement, such as gelatin, is employed, or the surfaces of the celluloid are made sticky by the use of a solvent, such as acetone. The three sheets as thus assembled are held together by means of proper stickers placed around the edges of the sheets, this being an expedient well-known in the glass compositing art. The set of sheets as thus assembled is ready for pressing and is placed in a rubber bag 6, as indicated in Figs. 5 and 6, each bag being of sufficient size so that it will carry a plurality of the sets of sheets 3 and 4, such sets of sheets being indicated in dotted lines in Fig. 5. After the sets of sheets to be composited are placed in the bag 6, a clamp 7 is applied at the end of the bag and the air is exhausted from the bag through the evacuating check valve 8. This exhausting action causes the bag to collapse around the sets of sheets, as indicated in Fig. 6 and withdraws any air which may be entrapped between the opposing faces of the sheets. The bag as thus evacuated is now placed in a pressure chamber 9 (Fig. 7) having a removable cover 10 and pipe connections 11 and 12. The compositing in this pressure chamber now proceeds in the ordinary way. That is, the temperature of the liquid in the tank is brought up to about 240 degrees F. by circulating the liquid to and from a heat transfer device by means of the pipes 11 and 12, after which the pressure is increased to about 150 pounds per square inch. After the rubber bag and its contents has been exposed to these conditions for a suitable period, ordinarily from 10 to 15 minutes, the pressure and temperature are reduced, and the rubber bag and its contents are removed from the pressure chamber, thus completing the pressing operation. The plates as thus composited are now removed from the bag and if goggle blanks are to be produced, they are cut, as indicated in dotted lines in Fig. 2, five lenses being cut from each of the plates. In this particular case, these plates are about 12½ inches long and 4 inches wide, the size of the plates and the number of lenses cut therefrom being dependent upon conditions and requirements. It is, of course, possible to cut the sheets of glass and celluloid to size, as indicated in Fig. 4, before compositing, but this is a somewhat more difficult method of procedure and the danger of the sheets slipping upon each other is greater with the small pieces than with the larger ones, such as shown in Figs. 2 and 3.

The foregoing method of procedure insures a good product with substantially no breakage and a minimum of slippage between the sheets during the compositing action. The small amount of breakage is due in a large measure to the fact that the opposing glass sheets match each other exactly in the matter of curvature which result is due to the fact that the sheets are bent together, one upon the other, as indicated in Fig. 1, and heretofore explained. The process is applicable to sheets of any size or shape, the mold 2 being modified as to size and shape in order to meet requirements.

What we claim is:

1. A process of making curved composite glass plates which consists in supporting two glass sheets which are to form the plate one upon the other above a concave mold, applying heat sufficient to make the sheets plastic and causing them to sink into and fit the mold, but not sufficient to cause them to stick together, assembling the sheets as thus bent with an interposed sheet of flexible reinforcing material and securing the sheets as thus assembled together.

2. A process of making curved composite glass plates which consists in supporting the two glass sheets which are to form the plate one upon the other above a concave mold, applying heat sufficient to make the sheets plastic and causing them to sink into and fit the mold, but not sufficient to cause them to stick together, assembling the sheets as thus bent with an interposed sheet of flexible reinforcing material and cementing the sheets as thus assembled together under heat and pressure.

3. A process of making curved composite glass plates, which consists in supporting the two glass sheets which are to form the plate one above the other above a curved mold, applying heat sufficient to make the sheets plastic but not sufficient to make them stick together, causing them to bend and fit the mold, assembling the sheets as thus bent with an interposed sheet of flexible reinforcing material, and securing the sheets as thus assembled together.

JAMES H. SHERTS.
JOHN WILLITS.